United States Patent
Lee et al.

(10) Patent No.: US 11,578,199 B2
(45) Date of Patent: Feb. 14, 2023

(54) POLYOLEFIN-BASED RESIN COMPOSITION FOR VEHICLE INTERIOR MATERIAL COMPRISING HEAT-TREATED WASTE COFFEE GROUNDS

(71) Applicants: Hyundai Motor Company, Seoul (KR); Kia Corporation, Seoul (KR); 4EN Incorporation, Seoul (KR); GS Caltex Corporatoin, Seoul (KR)

(72) Inventors: Han Ki Lee, Seoul (KR); A Rom Oh, Seoul (KR); Woo Ram Kim, Gyeonggi-do (KR); Yeon Kyu Lee, Seoul (KR); Jung Woo Roh, Seoul (KR)

(73) Assignees: Hyundai Motor Company, Seoul (KR); Kia Corporation, Seoul (KR); 4EN Incorporation, Seoul (KR); GS Caltex Corporation, Seoul (KR)

( * ) Notice: Subject to any disclaimer, the term of this patent is extended or adjusted under 35 U.S.C. 154(b) by 0 days.

(21) Appl. No.: 17/481,664

(22) Filed: Sep. 22, 2021

(65) Prior Publication Data

US 2022/0227980 A1   Jul. 21, 2022

(30) Foreign Application Priority Data

Jan. 20, 2021   (KR) .................. 10-2021-0007804

(51) Int. Cl.

| | |
|---|---|
| *C08L 23/12* | (2006.01) |
| *C08L 23/14* | (2006.01) |
| *C08L 23/16* | (2006.01) |
| *C08L 23/08* | (2006.01) |
| *C08L 23/26* | (2006.01) |
| *C08L 25/10* | (2006.01) |
| *C08K 3/26* | (2006.01) |
| *C08K 3/30* | (2006.01) |
| *C08K 3/34* | (2006.01) |
| *A23F 5/36* | (2006.01) |

(52) U.S. Cl.
CPC ............... *C08L 23/12* (2013.01); *A23F 5/36* (2013.01); *C08K 3/26* (2013.01); *C08K 3/30* (2013.01); *C08K 3/34* (2013.01); *C08L 23/0815* (2013.01); *C08L 23/142* (2013.01); *C08L 23/145* (2013.01); *C08L 23/16* (2013.01); *C08L 23/26* (2013.01); *C08L 25/10* (2013.01); *C08K 2003/265* (2013.01); *C08K 2003/3045* (2013.01); *C08K 2201/003* (2013.01); *C08L 2205/025* (2013.01); *C08L 2205/035* (2013.01); *C08L 2207/04* (2013.01)

(58) Field of Classification Search
CPC .................................. A23F 5/36; C08L 23/12
See application file for complete search history.

(56) References Cited

U.S. PATENT DOCUMENTS

| | | | |
|---|---|---|---|
| 2014/0187694 A1* | 7/2014 | Jang .................. | C08L 53/00 524/504 |
| 2018/0249755 A1 | 9/2018 | Hung | |
| 2022/0227982 A1* | 7/2022 | Lee .................. | C08L 23/14 |

FOREIGN PATENT DOCUMENTS

| | | |
|---|---|---|
| JP | H08-207046 A | 8/1996 |
| JP | 2008-019355 A | 1/2008 |
| KR | 101383528 B1 | 4/2014 |
| KR | 101490625 B1 * | 2/2015 |
| KR | 2017-0036423 A | 4/2017 |
| KR | 2020-0123305 A | 10/2020 |

OTHER PUBLICATIONS

Run et al. Molecules 2021, 26, 257 (Year: 2021).*

* cited by examiner

*Primary Examiner* — Mark S Kaucher
(74) *Attorney, Agent, or Firm* — Fox Rothschild LLP

(57) ABSTRACT

Disclosed is a polyolefin-based resin composition for a vehicle interior material including heat-treated waste coffee grounds. The resin composition includes a polyolefin-based resin, waste coffee grounds including a volatile matter (VM) in an amount less than about 20 wt % of the waste coffee grounds, a modified polypropylene, an inorganic filler, and a thermoplastic elastomer.

15 Claims, No Drawings

POLYOLEFIN-BASED RESIN COMPOSITION FOR VEHICLE INTERIOR MATERIAL COMPRISING HEAT-TREATED WASTE COFFEE GROUNDS

CROSS REFERENCE TO RELATED APPLICATION

The present application claims priority based on Korean Patent Application No. 10-2021-0007804, filed on Jan. 20, 2021, the entire content of which is incorporated herein for all purposes by this reference.

TECHNICAL FIELD

The present invention relates to a polyolefin-based resin composition for a vehicle interior material including heat-treated waste coffee grounds.

BACKGROUND

With the recent increase in environment-friendly vehicles such as electric vehicles, etc., the need to develop parts using environment-friendly materials is increasing. Moreover, there is a consumer tendency to consider the influence of the vehicle on the environment as a factor in making a vehicle purchase.

Meanwhile, coffee is a popular beverage enjoyed by people of all ages and genders, and the coffee-related market has been explosively growing year over year due to the emergence of various coffee makers and the explosive increase in the number of coffee shops.

Coffee consumption in Korea is very high, specifically 333 cups per person per year, and in connection therewith, 300,000 tons of waste coffee grounds, coffee husks, and the like are discarded per year. Some waste coffee grounds are used for personal consumption, for example, as deodorant or the like, however, the recycled amount is insignificant.

Most waste coffee grounds generated in Korea are sent to the landfill or incinerated. However, it is not known how waste coffee grounds discarded in landfills will affect the soil and organisms due to the caffeine, tannins and other components of coffee, and moreover, incineration generates combustion gases and causes air pollution.

Therefore, research for methods of recycling waste coffee grounds to reduce waste generation in an industrially useful and effective manner has been conducted. For example, attempts have been made to develop fibers or resins having waste coffee grounds added thereto. However, waste coffee grounds contain low-molecular-weight materials as natural materials, which are discharged during processing or use of parts, causing emission of VOCs and odors.

Conventionally, in order to remove water and low-molecular-weight materials such as cellulose, hemicellulose and the like from waste coffee grounds, washing with an organic solvent is performed, but there are disadvantages in that the removal efficiency is not good and in that harmful chemical materials are used.

As described above, waste coffee grounds containing large amounts of low-molecular-weight materials generate low-molecular-weight materials due to the heat generated by shear stress during processing, thus causing odors or a blooming phenomenon on the surface of the parts. In addition, molded products made of a resin composition using waste coffee grounds cannot be used for unpainted parts because low-molecular-weight materials such as cellulose, hemicellulose and the like bloom on the surface of the parts when exposed to UV radiation, causing surface defects such as changes in surface color.

The conventional technology for using waste coffee grounds has not solved problems such as deterioration of properties, emission of odors and VOCs, and the like, and thus limitations are imposed on application thereof to vehicle interior materials. For example, a portion of the waste coffee grounds is carbonized by heat during processing and remains in devices, thus acting as a foreign substance and causing a poor appearance of the molded product.

SUMMARY

In preferred aspects, provided is a resin composition in which the use of synthetic resin, which is derived from fossil fuels, is reduced by recycling waste coffee grounds.

The objectives of the present invention are not limited to the foregoing, and will be able to be clearly understood through the following description and to be realized by the means described in the claims and combinations thereof.

In an aspect, provided is a polyolefin-based resin composition for a vehicle interior material that may include: a polyolefin-based resin; waste coffee grounds including a volatile matter (VM) in an amount of less than about 20 wt % of the waste coffee grounds; a modified polypropylene; an inorganic filler; and a thermoplastic elastomer.

The polyolefin-based resin may suitably include one or more selected from the group consisting of polypropylene, polyethylene, polybutene, polyoctene, polyisoprene, and a copolymer obtained by polymerizing one or more monomers selected from the group consisting of propylene, ethylene, butylene and octene.

The polyolefin-based resin may include a first polypropylene having a melt index (230° C., under a load of 2.16 kg) of about 10 g/10 minutes to 30 g/10 minutes and a second polypropylene having a melt index (230° C., under a load of 2.16 kg) of about 50 g/10 minutes to 100 g/10 minutes.

The polyolefin-based resin may suitably include the first polypropylene and the second polypropylene at a weight ratio of about 7:3 to 9:1.

The waste coffee grounds may have an average particle diameter (D50) of about 500 μm to 1,000 μm.

The waste coffee grounds may be heat-treated so that the volatile matter content thereof is less than about 20 wt % of the waste coffee grounds.

The volatile matter may include a compound of hydrogen and carbon of the waste coffee grounds other than fixed carbon.

The modified polypropylene may include one or more polypropylene selected from the group consisting of a polypropylene homopolymer, a propylene/α-olefin copolymer, and a propylene/non-conjugated diene-based compound copolymer, which are modified with a functional group.

The functional group may suitably include one or more selected from the group consisting of maleic anhydride, carboxylic acid, carboxylic anhydride, epoxy, hydroxyl, amino, isocyanate, thiol, and oxazoline.

The modified polypropylene may suitably include an amount of about 5 wt % to 10 wt % of the functional group based on the weight of the polypropylene.

The inorganic filler may suitably include one or more selected from the group consisting of talc, calcium carbonate, and barium sulfate.

The thermoplastic elastomer may suitably include one or more selected from the group consisting of ethylene-α-olefin copolymer rubber, and styrene-olefin-based rubber.

The ethylene-α-olefin copolymer rubber may suitably include one or more selected from the group consisting of ethylene propylene copolymer, ethylene butene-1 copolymer, and ethylene octene-1 copolymer.

The styrene-olefin-based rubber may suitably include one or more selected from the group consisting of styrene-ethylene-butylene-styrene rubber, styrene-butadiene-styrene rubber, styrene-isoprene-styrene rubber, and styrene-butadiene rubber.

The resin composition may suitably include an amount of about 50 wt % to 70 wt % of the polyolefin-based resin, an amount of about 5 to 20 wt % of the waste coffee grounds, an amount of about 1 wt % to 5 wt % of the modified polypropylene, an amount of about 10 wt % to 20 wt % of the inorganic filler, and an amount of about 10 wt % to 20 wt % of the thermoplastic elastomer, based on the total weight of the resin composition.

According to various exemplary embodiments of the present invention, it is possible to obtain a resin composition in which the use of a synthetic resin derived from fossil fuel is reduced by recycling waste coffee grounds.

According to various exemplary embodiments of the present invention, since waste coffee grounds from which low-molecular-weight materials are removed through heat treatment are used, gas generation may be decreased upon processing thereof, and emission of odors and VOCs can be reduced.

The resin composition according to various exemplary embodiments of the present invention may have good light resistance and does not cause odors, and can thus be used for unpainted parts. Therefore, additional parts and preparation steps can be omitted, which is very helpful in improving productivity.

The effects of the present invention are not limited to the foregoing, and should be understood to include all effects that can be reasonably anticipated from the following description.

Other aspects of the invention are disclosed infra.

DETAILED DESCRIPTION

The above and other objectives, features and advantages of the present invention will be more clearly understood from the following preferred embodiments taken in conjunction with the accompanying drawings. However, the present invention is not limited to the embodiments disclosed herein, and may be modified into different forms. These embodiments are provided to thoroughly explain the invention and to sufficiently transfer the spirit of the present invention to those skilled in the art.

Throughout the drawings, the same reference numerals will refer to the same or like elements. For the sake of clarity of the present invention, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present invention. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

The present invention pertains to a polyolefin-based resin composition for a vehicle interior material that may include a polyolefin-based resin, waste coffee grounds, modified polypropylene, an inorganic filler, and a thermoplastic elastomer.

Hereinafter, individual components of the resin composition are described in detail.

(A) Polyolefin-Based Resin

The polyolefin-based resin may be a base resin, and may include a thermoplastic resin. Preferably, the polyolefin-based resin may include one or more selected from the group consisting of polypropylene, polyethylene, polybutene, polyoctene, polyisoprene, and a copolymer obtained by polymerizing one or more monomers selected from the group consisting of propylene, ethylene, butylene and octene.

The polyolefin-based resin may suitably include a first polypropylene having a melt index (230° C., under a load of 2.16 kg) of about 10 g/10 minutes to 30 g/10 minutes and a second polypropylene having a melt index (230° C., under a load of 2.16 kg) of about 50 g/10 minutes to 100 g/10 minutes.

When the melt index of the first polypropylene is less than about 10 g/10 minutes, the tensile strength of the molded product may decrease, whereas when the melt index thereof is greater than about 30 g/10 minutes, the impact strength of the molded product may decrease.

When the melt index of the second polypropylene is less than about 50 g/10 minutes, the flowability of the resin composition may be reduced, whereas when the melt index thereof is greater than about 100 g/10 minutes, the properties of the molded product may be deteriorated.

The polyolefin-based resin may suitably include the first polypropylene and the second polypropylene at a weight ratio of about 8:2 to 9:1.

(B) Waste Coffee Grounds

In general, waste coffee grounds remaining after coffee extraction may include about 50 wt % of water, about 36 wt % of volatile matter, about 0.5 wt % of ash, and about 6.8 wt % of fixed carbon based on industrial analysis, and contain 56% of carbon, 7% of hydrogen, 2% of nitrogen, and 33% of oxygen based on chemical analysis.

The volatile matter may include a compound of carbon and hydrogen, and may be discharged as a reducing gas such as carbon monoxide, hydrogen, etc. at high temperatures. The volatile matter in the waste coffee grounds generally begins to volatilize from a temperature of about 200° C. to 250° C. and is then volatilized in the form of hydrogen or carbon monoxide up to about 800° C.

Accordingly, the waste coffee grounds are heat-treated at a temperature of about 500° C. to 800° C. using a continuous heat treatment reactor such that the volatile matter content thereof may be reduced to less than about 20 wt % of the total weight of the coffee grounds. When the volatile matter content thereof is about 20 wt % or greater, gases may be generated during processing of molded products, which may deteriorate the properties thereof.

The average particle diameter (D50) of the waste coffee grounds may be about 500 μm to 1,000 μm. The heat-treated waste coffee grounds may be pulverized in order to adjust the average particle diameter (D50) of the waste coffee grounds. When the average particle diameter (D50) of the waste coffee grounds is less than about 500 μm, there may be a problem of poor feeding, whereas when the average particle diameter thereof is greater than about 1,000 μm, dispersibility in the resin composition may be decreased and the properties of the molded product may be deteriorated.

(C) Modified Polypropylene

The modified polypropylene may include those obtained by modifying one or more polypropylene selected from the group consisting of a polypropylene homopolymer, a propylene/α-olefin copolymer, and a propylene/non-conjugated diene-based compound copolymer, and combinations thereof with a functional group. The functional group may include one or more selected from the group consisting of maleic anhydride, carboxylic acid, carboxylic anhydride, epoxy, hydroxyl, amino, isocyanate, thiol, and oxazoline.

Preferably, the modified polypropylene may include polypropylene grafted with maleic anhydride.

The modified polypropylene may suitably include an amount of about 5 wt % to 10 wt % of the functional group based on the weight of a resin component such as polypropylene. When the amount of the functional group is less than about 5 wt %, compatibility may decrease, whereas when the amount of the functional group is greater than about 10 wt %, the water content may increase, odors may be generated during processing of the molded product.

(D) Inorganic Filler

The inorganic filler may improve the rigidity, impact strength and the like of a molded product.

The inorganic filler may include one or more selected from the group consisting of talc, calcium carbonate, and barium sulfate.

(E) Thermoplastic Elastomer

The thermoplastic elastomer may improve the impact strength, rigidity and the like of a molded product.

The thermoplastic elastomer may include one or more selected from the group consisting of ethylene-α-olefin copolymer rubber, and styrene-olefin-based rubber.

The ethylene-α-olefin copolymer rubber may include one or more selected from the group consisting of ethylene propylene copolymer, ethylene butene-1 copolymer, and ethylene octene-1 copolymer.

The styrene-olefin-based rubber may include one or more selected from the group consisting of styrene-ethylene-butylene-styrene rubber, styrene-butadiene-styrene rubber, styrene-isoprene-styrene rubber, and styrene-butadiene rubber.

The resin composition may suitably include an amount of about 50 to 70 wt % of the polyolefin-based resin, an amount of about 5 wt % to 20 wt % of the waste coffee grounds, an amount of about 1 wt % to 5 wt % of the modified polypropylene, an amount of about 10 wt % to 20 wt % of the inorganic filler, and an amount of about 10 wt % to 20 wt % of the thermoplastic elastomer, based on the total weight of the resin composition.

When the amount of the waste coffee grounds is less than about 5 wt %, the effect of reducing the use of synthetic resin due to the addition thereof may become insignificant. On the other hand, when the amount of the waste coffee grounds is greater than about 20 wt %, the impact strength of the molded product may decrease and the flowability of the resin composition may decrease.

When the amount of the modified polypropylene is less than about 1 wt %, the interfacial affinity between the hydrophilic waste coffee grounds and the hydrophobic resin may decrease, and thus the properties of the molded product may deteriorate. On the other hand, when the amount of the modified polypropylene is greater than about 5 wt %, the properties of the molded product may deteriorate and odors may occur.

When the amount of the inorganic filler is less than about 10 wt %, the rigidity and heat resistance of the molded product may decrease, whereas when the amount thereof is greater than about 20 wt %, the impact strength of the molded product may decrease.

When the amount of the thermoplastic elastomer is less than about 10 wt %, the impact strength of the molded product may decrease, whereas when the amount thereof is greater than about 20 wt %, the rigidity of the molded product may decrease.

EXAMPLE

A better understanding of the present invention may be obtained through the following examples and comparative examples. However, these examples are merely set forth to illustrate the present invention, and are not to be construed as limiting the scope of the present invention.

Examples 1 to 3 and Comparative Examples 1 to 6

Each polyolefin-based resin composition was prepared using components in the amounts shown in Table 1 below. Molded products were manufactured therefrom, and the properties thereof were evaluated. The results thereof are shown in Table 2 below.

TABLE 1

| Classification | Composition [wt %] | | | | | | | | |
|---|---|---|---|---|---|---|---|---|---|
| | A-1 | A-2 | B | C | D | E | F | G | Total |
| Example 1 | 53 | 12 | 5 | 3 | 015 | 12 | — | — | 100 |
| Example 2 | 48 | 12 | 10 | 3 | 15 | 12 | — | — | 100 |
| Example 3 | 38 | 12 | 20 | 3 | 15 | 12 | — | — | 100 |
| Comparative Example 1 | 61 | 12 | — | — | 15 | 12 | — | — | 100 |
| Comparative Example 2 | 53 | 12 | — | 3 | 15 | 12 | 5 | — | 100 |
| Comparative Example 3 | 48 | 12 | — | 3 | 15 | 12 | 10 | — | 100 |
| Comparative Example 4 | 43 | 12 | — | 3 | 15 | 12 | 15 | — | 100 |
| Comparative Example 5 | 48 | 12 | — | 3 | 15 | 12 | — | 10 | 100 |
| Comparative Example 6 | 51 | 12 | 10 | — | 15 | 12 | — | — | 100 |

In Table 1, A-1 is a first polypropylene, which is a polypropylene copolymer resin having a melt index (230° C., under a load of 2.16 kg) of 27 g/10 minutes (made by GS Caltex, M560).

A-2 is a second polypropylene, which is a polypropylene copolymer resin having a melt index (230° C., under a load of 2.16 kg) of 60 g/10 minutes (made by PolyMirae, EA5075).

B is heat-treated waste coffee grounds having an average particle diameter (D50) of 500 μm to 1,000 μm and a volatile matter content of less than 20 wt % (made by 4EN).

C is a modified polypropylene grafted with 5 wt % of maleic anhydride (made by Iruchem, Irubond100).

D is an inorganic filler, that is, talc having an average particle size of 4.5 μm (made by KOCH).

E is a thermoplastic elastomer, that is, an octene-based polyolefin impact modifier having a melt index (190° C., under a load of 2.16 kg) of 13 g/10 minutes (made by Dow, Engage8137).

F is a lubricant, particularly a fatty-acid-amide-based lubricant in which fatty acid soap and amide are mixed (made by Iruchem, TPX1000).

G is bamboo wood powder (made by Jeru Plastics).

In Table 2, the tensile strength, bending strength, bending modulus, Izod impact strength, and thermal deformation temperature were measured according to the following ISO test methods, odors were evaluated according to MS300-34, and light resistance was measured and evaluated according to MS210-05 (89±3° C., 50±5% RH, exposure to 126 MJ/m$^2$ (65.5 W/m$^2$×530 hr)).

Tensile strength: ISO 527, a test speed of 50 mm/min
Bending strength: ISO 178, a test speed of 2 mm/min
Bending modulus: ISO 178, a test speed of 2 mm/min
IZOD impact strength: ISO 180, using a notched test piece, room temperature (23° C.)
Heat deformation temperature: ISO 75, a stress of 0.45 MPa As shown in Table 2, Comparative Example 1 was a resin composition not including waste coffee grounds and including polyolefin-based resins (A-1, A-2) in larger amounts than in the Examples, and the properties of Comparative Example 1 were not notably different from those of Examples 1 and 2. Therefore, according to various exemplary embodiments of the present invention, the use of the synthetic resin can be effectively reduced without deterioration of properties.

Comparative Examples 2 to 4 were resin compositions including waste coffee grounds that were not heat-treated, and all of bending strength, Izod impact strength, heat deformation temperature, odor, and light resistance thereof were deteriorated compared to Examples 1 to 3.

Comparative Example 5 was a resin composition including bamboo wood powder in lieu of heat-treated waste coffee grounds, and the Izod impact strength thereof was greatly reduced and strong odors were emitted therefrom.

Comparative Example 6 was a resin composition not including a modified polypropylene, and the tensile strength and Izod impact strength thereof were greatly reduced.

As described hereinbefore, although the exemplary embodiments have been described based on limited examples and drawings, various modifications and variations are possible based on the above description, and will be evident to those of ordinary skill in the art. For example, even if the described techniques are performed in a different order from the described method and/or the described components are coupled or combined in a form different from the described method, or replaced with other components or equivalents, appropriate results can be achieved. Therefore,

TABLE 2

| Classification | Tensile strength [MPa] | Bending strength [MPa] | Bending modulus [MPa] | Izod impact strength [KJ/m$^2$] | Heat deformation temperature [° C.] | Odor [ranking] | Light resistance |
|---|---|---|---|---|---|---|---|
| Example 1 | 24 | 34 | 1880 | 12.2 | 109 | 1.5 | ○ |
| Example 2 | 23 | 35 | 1930 | 12.1 | 111 | 1.5 | ○ |
| Example 3 | 22 | 35 | 1960 | 11.1 | 110 | 2.0 | ○ |
| Comparative Example 1 | 25 | 38 | 1890 | 12.5 | 110 | 1.5 | ○ |
| Comparative Example 2 | 24 | 34 | 1730 | 10.3 | 92 | 2.0 | Δ |
| Comparative Example 3 | 22 | 27 | 1680 | 8.7 | 93 | 3.5 | X |
| Comparative Example 4 | 19 | 25 | 1510 | 6.3 | 95 | 3.5 | X |
| Comparative Example 5 | 21 | 33 | 1970 | 3.3 | 105 | 4.0 | X |
| Comparative Example 6 | 20 | 33 | 1920 | 10.7 | 108 | 2.0 | ○ |

What is claimed is:

1. A resin composition for a vehicle interior material, comprising:
   a polyolefin-based resin;
   waste coffee grounds comprising a volatile matter (VM) in an amount less than about 20 wt % of the waste coffee grounds;
   a modified polypropylene;
   an inorganic filler; and
   a thermoplastic elastomer.

2. The resin composition of claim 1, wherein the polyolefin-based resin comprises one or more selected from the group consisting of polypropylene, polyethylene, polybutene, polyoctene, polyisoprene, and a copolymer obtained by polymerizing one or more monomers selected from the group consisting of propylene, ethylene, butylene and octene.

3. The resin composition of claim 1, wherein the polyolefin-based resin comprises a first polypropylene having a melt index (230° C., under a load of 2.16 kg) of about 10 g/10 minutes to 30 g/10 minutes and a second polypropylene having a melt index (230° C., under a load of 2.16 kg) of about 50 g/10 minutes to 100 g/10 minutes.

4. The resin composition of claim 3, wherein the polyolefin-based resin comprises the first polypropylene and the second polypropylene at a weight ratio of about 7:3 to 9:1.

5. The resin composition of claim 1, wherein the waste coffee grounds have an average particle diameter (D50) of about 500 μm to 1,000 μm.

6. The resin composition of claim 1, wherein the waste coffee grounds are heat-treated such that a volatile matter content thereof is less than about 20 wt %.

7. The resin composition of claim 1, wherein the volatile matter comprises a compound of hydrogen and carbon of the waste coffee grounds other than fixed carbon.

8. The resin composition of claim 1, wherein the modified polypropylene comprises one or more selected from the group consisting of a polypropylene homopolymer, a propylene/α-olefin copolymer, and a propylene/non-conjugated diene-based compound copolymer, which are modified with a functional group.

9. The resin composition of claim 8, wherein the functional group comprises one or more selected from the group consisting of maleic anhydride, carboxylic acid, carboxylic anhydride, epoxy, hydroxyl, amino, isocyanate, thiol, and oxazoline.

10. The resin composition of claim 8, wherein the modified polypropylene comprises an amount of about 5 wt % to 10 wt % of the functional group based on a weight of the polypropylene.

11. The resin composition of claim 1, wherein the inorganic filler comprises one or more selected from the group consisting of talc, calcium carbonate, and barium sulfate.

12. The resin composition of claim 1, wherein the thermoplastic elastomer comprises one or more selected from the group consisting of ethylene-α-olefin copolymer rubber, and styrene-olefin-based rubber.

13. The resin composition of claim 12, wherein the ethylene-α-olefin copolymer rubber comprises one or more selected from the group consisting of ethylene propylene copolymer, ethylene butene-1 copolymer, and ethylene octene-1 copolymer.

14. The resin composition of claim 12, wherein the styrene-olefin-based rubber comprises one or more selected from the group consisting of styrene-ethylene-butylene-styrene rubber, styrene-butadiene-styrene rubber, styrene-isoprene-styrene rubber, and styrene-butadiene rubber.

15. The resin composition of claim 1, comprising:
   an amount of about 50 wt % to 70 wt % of the polyolefin-based resin;
   an amount of about 5 to 20 wt % of the waste coffee grounds;
   an amount of about 1 wt % to 5 wt % of the modified polypropylene;
   an amount of about 10 wt % to 20 wt % of the inorganic filler; and
   an amount of about 10 wt % to 20 wt % of the thermoplastic elastomer,
   based on the total weight of the resin composition.

* * * * *